Sept. 15, 1931.  H. F. E. GAMM  1,823,443
ADJUSTABLE MIXER AND DRIVE
Filed April 4, 1930
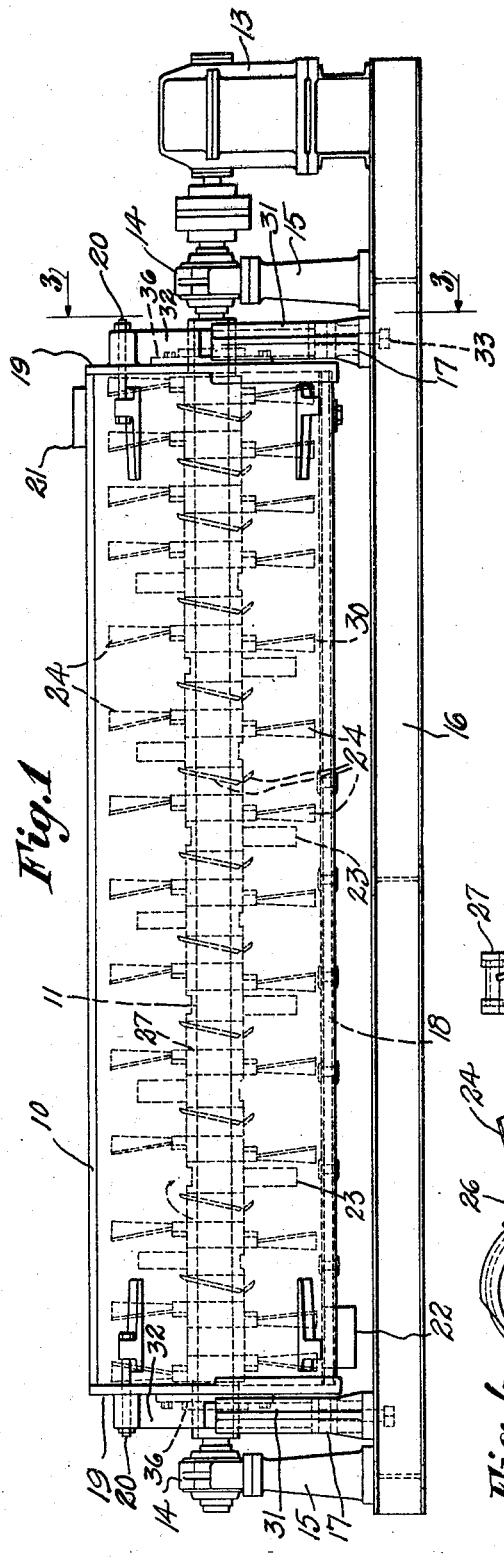
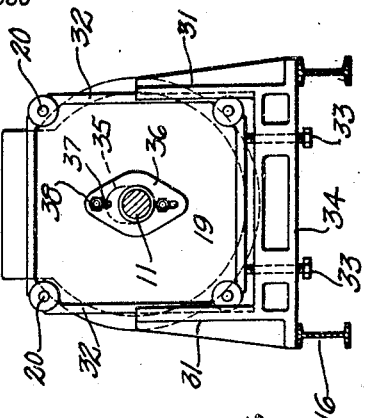
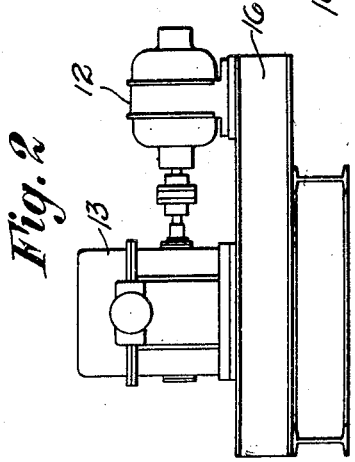
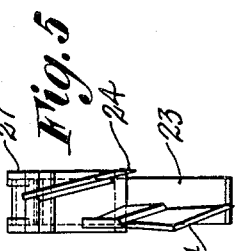
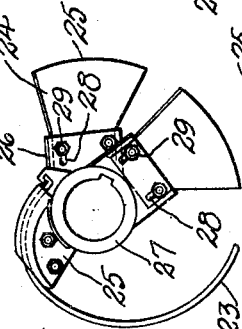
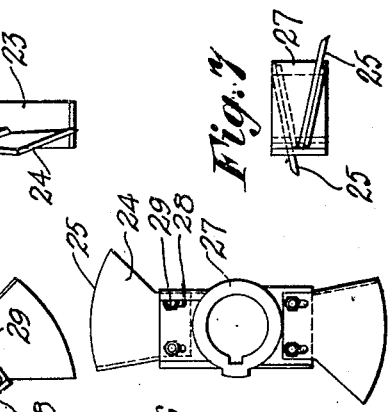
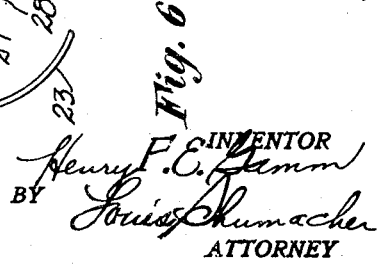

Patented Sept. 15, 1931

1,823,443

UNITED STATES PATENT OFFICE

HENRY F. E. GAMM, OF RUTHERFORD, NEW JERSEY

ADJUSTABLE MIXER AND DRIVE

Application filed April 4, 1930. Serial No. 441,468.

This invention relates to machines having adjusting means for taking up excessive clearance or wear on rotary mixing or crushing elements, and to drive means for the machines.

One object of the invention is to provide a device of the character described including elements for agitating, mixing, or crushing materials supported on a casing, and improved means to produce a relative adjustment of the casing with respect to said elements.

Another object of the invention is to provide a cylindrical casing having a longitudinal shaft carrying a plurality of radial arms coacting with the casing for mixing or crushing a material, and the casing being externally adjustable upward in an improved manner to take up the wear on all the arms simultaneously.

Another object of the invention is to provide an improved drive for said shaft.

A further object of the invention is to furnish a device of the nature set forth which has relatively few and simple parts, is easy to assemble, comparatively inexpensive to manufacture, rugged and reliable in operation, adapted for rapid and easy adjustment, and efficient in use to a high degree.

To illustrate a typical use of the invention, reference may be had to mixing machines used for the manufacture of coal briquettes. The machines heretofore in use having included an elongated cylindrical casing through which extended an axial shaft carrying arms for mixing and propelling the material along the casing from the inlet to the outlet thereof. As certain of these arms wear down at their ends, a mechanic would enter the casing and readjust such arms to maintain the required clearance with the bottom of the casing.

By this invention, the necessity of opening the casing and causing the mechanic to laboriously adjust the arms individually is obviated. In the machines made according to this invention, the casing is elevated until the bottom thereof is at a predetermined clearance. Thus the casing need not be opened, nor the setting of the arms or blades disturbed. Furthermore, adjustment of the clearance is accomplished simultaneously for all the arms.

It is therefore a further object of the invention to provide a device for eliminating the difficulties heretofore existing and to permit an efficient carrying out of the advantages above mentioned.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawings, wherein like parts are designated by the same reference characters throughout the several views.

In the drawings:

Figure 1 is a view in side elevation of a device embodying the invention.

Fig. 2 is an end elevation thereof.

Fig. 3 is a vertical sectional view taken on line 3—3 of Fig. 1.

Fig. 4 is a side view of an assembly of a mixing arm and stirring blade.

Fig. 5 is an edge view of the assembly.

Fig. 6 is a side view showing a different mounting for the blades.

Fig. 7 is a top plan view thereof.

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawings, therefore, is submitted merely as showing the preferred exemplification of the invention.

Generally described, this invention provides a machine which while primarily constructed for mixing materials that are subquently pressed into briquettes, embodies principles of construction that can be employed in devices that are used for any mixing, agitating, or even crushing action on materials of many different kinds and for various purposes. The embodiment of the invention illustrated in the drawings shows a cylindrical casing, but obviously any suitable casing or support for the materials can be used. Extending axially through the casing is a shaft carrying any suitable radial means, such as a screw, but preferably the arms disclosed. A large number of the arms are utilized to obtain an efficient action on the materials. A relative rotation is obtained by rotating the shaft or the casing, preferably the former. The casing may be supported in any suitable manner along the length thereof, or solely at its ends, for substantially vertical movement to adjust the clearance between the arms and the bottom of the casing, thus taking up the wear on the arms. For this purpose, various lifting devices can be employed; as, for example, the jacks herein disclosed. This invention permits the clearance at all of the arms to be simultaneously adjusted, without dismantling or opening the machine, and without necessitating individual adjustment of the arms. It will be appreciated that within the scope of the invention, the simultaneous adjustment may also be accomplished by moving the shaft, but the preferred embodiment is as above described, and it permits the use of a simplified drive. The latter includes an enclosed gear train, and ball bearings are employed for the said shaft.

Referring in detail to the drawings, a device is shown of one embodiment of the invention, including a cylindrical casing 10, having a shaft 11 extending substantially axially therethrough. A motor 12 operates any suitable gear train (not shown), which is enclosed in a housing 13, and the gear train being connected to said shaft. The latter is mounted for rotation by any well known bearings, preferably ball bearings 14, which are mounted in any desired manner in conjunction with the casing 10 or on the separate end supports 15. The entire apparatus is mounted on a suitable floor or frame 16 by means 17 disposed at convenient points along the casing, and preferably at the ends thereof.

To heat the casing 10, the same is provided with a steam jacket 18 or other economical heating means, according to the temperature that may be required for the charge. The said casing may be closed at its ends by walls 19 that are connected with the casing, for example, by bolts 20. The charge is fed into the casing in any desired way, as, for instance, through an opening 21, and it may be removed therefrom through an opening 22.

In the manufacture of briquettes, the coal dust and a suitable agglomerating material are thoroughly mixed at a temperature consistent with the nature of the material and the results to be obtained. Among the agglomerating materials, may be mentioned residuum asphaltum, coal tar, wood pitch, starch, waste from paper mills, and others. Those materials which have been found to function most efficiently possess binding qualities and may be denominated binders. The coal dust and the binders are thoroughly agitated at temperatures which may be between 180° F. and 200° F., or at any other temperatures which may be useful in producing a uniform and consistent paste. The latter is then subjected to a suitable pressure to form the briquettes.

To knead, agitate and feed the charge of coal dust and binder through the casing, radial means is mounted on shaft, which may be embodied in various forms, within the scope of this invention, but is here shown for illustrative reasons, as including kneading mixing arms 23, and stirring and feeding blades 24. The said arms and blades are uniformly spaced along the shaft and in any desired alternation with each other. Although they may be integral with the shaft, they are preferably separable therefrom, and may be individually mounted thereon. The mounting referred to may include brackets 25, 26 for the respective arms, said brackets being sleeved on the shaft at 27; and keyed or otherwise fastened thereto. The blades 24 may be individually adjusted so that their ends 25 maintain a predetermined clearance with a lower portion of the casing wall. The individual adjustment may be accomplished by providing slots 28 in the brackets 26, and bolts 29 being passed through the slots. This individual adjustment is used only when the machine is assembled and initially set up for use. All subsequent adjustment of the blades is accomplished as hereinafter set forth.

It is essential that the blades maintain a predetermined minimum clearance, with the lower portion of the casing wall on which the charge rests, not only to agitate the entire charge, but also to prevent the formation of a coating of the coal dust and paste, as the same is extremely difficult to remove after solidification has occurred, and also acts as an insulator decreasing the heating efficiency of the machine. In course of operation, the ends of the blades are subjected to wear, so that adjustment of the clearance 30 is necessary from time to time.

The adjustment of the clearance 30 between the bottom wall of the casing and the ends of the blades is accomplished herein by a novel construction, whereby the casing is raised in a substantially vertical direction, to adjust the clearance 30 for all of the blades simultaneously. All the blades are thus adjusted as a unit. For this purpose, the supports 17 for the casing have guides 31 extending in a radial or vertical direction.

These guides coact with the casing to determine the path of adjustment thereof. As shown in the drawings, the said guides may receive rib or flange portions 32 of the said end walls. Any suitable means may be used to raise the casing, as, for instance, the jack screws 33 which are threaded through cross members 34 of the said supports. These screws may bear on the said end walls of the casing, or on any other strong and rigid part thereof.

The shaft 11 passes through slots 35 in the end walls of the casing, these slots being closed by plates 36 which take around the shaft and are vertically adjustable, as they are provided with slots 37 for bolts 38.

In operation, after the blades 25 have been individually adjusted for an initial setting in setting up the machine, no further adjustment need be required. After wear on the blades has occurred, the jack screws 33 are turned to elevate the casing until it may be determined in any suitable manner, as by sound, that the predetermined clearance has been obtained, or if such clearance be too slight, the casing is lowered a trifle, and thus the proper clearance may be established.

It will be understood that the term "coal briquettes" may also include briquettes made of coal, charcoal, coke from coal or oil distillation processes, nut husks, or other pulverized or granular materials suitable for briquetting.

It will be appreciated that within the scope of the invention, various changes may be made in the construction of which the drawings illustrate but one embodiment, and that the scope of the invention is therefore defined in the following claims.

I claim:

1. A device for mixing materials for manufacture into coal briquettes, including a substantially horizontal normally stationary cylindrical mixer casing, said mixer casing having an upper inlet and lower outlet at opposite ends of the mixer casing for respectively receiving and discharging said materials, said mixer casing having an otherwise closed bottom wall, a heating jacket for the mixer casing extending in a longitudinal and circular direction along the outside thereof, a rotary shaft extending substantially centrally longitudinally through said mixer casing, spaced blades on the shaft having a predetermined clearance with a lower wall portion of said mixer casing, said blades including stirring, feeding means and kneading, crushing means, said mixer casing having a cylinder and removable end closure wall, means for supporting the mixer casing and moving the same bodily upward relative to the blades to adjust the clearance between the same and the lower wall portion of the mixer casing, and bearing means outside of the mixer casing for supporting the shaft at a fixed elevation.

2. A device for mixing materials for manufacture into coal briquettes, including a substantially horizontal normally stationary cylindrical mixer casing, said mixer casing having an upper inlet and lower outlet at opposite ends of the mixer casing for respectively receiving and discharging said materials, said mixer casing having an otherwise closed bottom wall, a heating jacket for the mixer casing extending in a longitudinal and circular direction along the outside thereof, a rotary shaft extending substantially centrally longitudinally through said mixer casing, spaced blades on the shaft having a predetermined clearance with a lower wall portion of said mixer casing, said blades including stirring, feeding means and kneading, crushing means, means for supporting the mixer casing, and moving the same bodily upward relative to the blades to adjust the clearance between the same and the lower wall portion of the mixer casing, said mixer casing having end walls removably rigidly connected to the mixer casing cylinder, said end walls having guide means for guiding the mixer casing in its adjusting movement, and separate bearing means for the outside of the mixer casing for supporting the shaft at a fixed elevation.

3. A device for mixing materials for manufacture into coal briquettes, including a substantially horizontal normally stationary cylindrical mixer casing, said mixer casing having an upper inlet and lower outlet at opposite ends of the mixer casing for respectively receiving and discharging said materials, said mixer casing having an otherwise closed bottom wall, a heating jacket for the mixer casing extending in a longitudinal and circular direction along the outside thereof, a rotary shaft extending substantially centrally longitudinally through said mixer casing, spaced blades on the shaft having a predetermined clearance with a lower wall portion of said mixer casing, said blades including stirring, feeding means and kneading, crushing means, means for supporting the mixer casing, and moving the same bodily upward relative to the blades to adjust the clearance between the same and the lower wall portion of the mixer casing, said mixer casing having end walls removably rigidly connected to the mixer casing cylinder, said end walls having means for guiding the mixer casing in its adjusting movement, separate bearing means for the outside of the mixer casing for supporting the shaft at a fixed elevation, said end walls having slots through which the shaft extends and along which the latter is movable for adjustment, and movable closure plates taking around said shaft and connected to said end walls for closing the otherwise open portions of the slots.

4. A device for mixing materials for manufacture into coal briquettes, including a substantially horizontal normally stationary cylindrical mixer casing, said mixer casing having an upper inlet and lower outlet at opposite ends of the mixer casing for respectively receiving and discharging said materials, said mixer casing having an otherwse closed bottom wall, a heating jacket for the mixer casing extending in a longitudinal and circular direction along the outside thereof, a rotary shaft extending substantially centrally longitudinally through said mixer casing, spaced blades on the shaft having a predetermined clearance with a lower wall portion of said mixer casing, said blades including stirring, feeding means and kneading, crushing means, said mixer casing having a cylinder and removable end closure walls, means for supporting the mixer casing and moving the same bodily upward relative to the blades to adjust the clearance between the same and the lower wall portion of the mixer casing, and bearing means outside of the mixer casing for supporting the shaft at a fixed elevation, the means for supporting the mixer casing engaging the said end walls as distinguished from the cylinder.

5. A device for mixing materials for manufacture into coal briquettes, including a substantially horizontal normally stationary cylindrical mixer casing, said mixer casing having an upper inlet and lower outlet at opposite ends of the mixer casing for respectively receiving and discharging said materials, said mixer having an otherwise closed bottom wall, a heating jacket for the mixer casing extending in a longitudinal and circular direction along the outside thereof, a rotary shaft extending substantially centrally longitudinally through said mixer casing, spaced blades on the shaft having a predetermined clearance with a lower wall portion of said mixer casing, said blades including stirring, feeding means and kneading, crushing means, said mixer casing having a cylinder and removable end closure walls means for supporting the mixer casing and moving the same bodily upward relative to the blades to adjust the clearance between the same and the lower portion of the mixer casing, and bearing means outside of the mixer casing for supporting the shaft at a fixed elevation, said supporting means including frames for the mixer casing disposed at said end walls, the supporting frames having each a U portion slidably engaging opposite edge portions of the respective end walls for guiding the mixer casing in the adjusting movement of the latter, and screw means on said frames for bearing on said end walls for raising or lowering the mixer casing.

In testimony whereof I affix my signature.

HENRY F. E. GAMM.